(12) United States Patent
Herrada

(10) Patent No.: US 10,873,231 B2
(45) Date of Patent: Dec. 22, 2020

(54) BRUSHLESS DC ELECTRIC MOTOR AND ASSOCIATED VEHICLE

(71) Applicant: Valeo Systèmes d'Essuyage, Le Mesnil Saint Denis (FR)

(72) Inventor: Jose Luis Herrada, La Verriere (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/216,319

(22) Filed: Dec. 11, 2018

(65) Prior Publication Data

US 2019/0190340 A1 Jun. 20, 2019

(30) Foreign Application Priority Data

Dec. 14, 2017 (FR) ...................................... 17 62185

(51) Int. Cl.

| H02K 3/18 | (2006.01) |
| H02K 3/28 | (2006.01) |
| H02K 1/14 | (2006.01) |
| H02K 21/16 | (2006.01) |
| H02K 29/03 | (2006.01) |
| H02K 1/27 | (2006.01) |

(52) U.S. Cl.
CPC ............... *H02K 3/28* (2013.01); *H02K 1/146* (2013.01); *H02K 1/148* (2013.01); *H02K 3/18* (2013.01); *H02K 21/16* (2013.01); *H02K 29/03* (2013.01); *H02K 1/278* (2013.01); *H02K 2201/06* (2013.01); *H02K 2213/03* (2013.01)

(58) Field of Classification Search
CPC H02K 3/28; H02K 1/14; H02K 1/146; H02K 1/26; H02K 21/16; H02K 21/20

USPC ............ 310/179, 216.096, 216.092–216.097
See application file for complete search history.

(56) References Cited

U.S. PATENT DOCUMENTS

2006/0028087 A1    2/2006 Ionel et al.
2009/0108699 A1*   4/2009 Li ........................... H02K 1/148
                                                    310/216.009

FOREIGN PATENT DOCUMENTS

| CN | 105141094 A | 12/2015 |
| DE | 102015207368 A1 | 10/2016 |
| JP | 2004215483 A | 7/2004 |

OTHER PUBLICATIONS

Preliminary Search Report issued in corresponding French Patent Application No. 1762185, dated Aug. 29, 2018 (2 pages).

* cited by examiner

*Primary Examiner* — Terrance L Kenerly
(74) *Attorney, Agent, or Firm* — Osha Bergman Watanabe & Burton LLP

(57) ABSTRACT

The present invention relates to a brushless dc electric motor (1) comprising:
a rotor (3) comprising at least two pairs of poles,
a stator (5) having a plurality of teeth (D1, D2) around which windings (B1, B2, B3, B'1, B'2, B'3) forming coils for electromagnetic excitation of the rotor (3) are wound,
wherein the stator (5) comprises a first type of tooth (D1) covering a first electrical angle and a second type (D2) of tooth covering a second electrical angle different from the first electrical angle and wherein a phase of the motor is formed by windings (B1, B'1 or B2, B'2 or B3, B'3) wound onto teeth of the first type (D1) and second type (D2).

13 Claims, 4 Drawing Sheets

BRUSHLESS DC ELECTRIC MOTOR AND ASSOCIATED VEHICLE

The present invention relates to a brushless dc electric motor intended in particular for motor vehicle equipment.

Numerous brushless dc electric motors are used in motor vehicle equipment, in particular in the geared motors of wiper devices.

The brushless dc electric motors may offer numerous advantages such as a long working life, compact dimensions and low power consumption.

Moreover, by applying a substantially sinusoidal command, it is possible to obtain a low noise level.

The present invention therefore aims to propose a brushless dc motor which has a low sound level.

For this purpose the present invention relates to a brushless dc electric motor comprising:
 a rotor comprising at least two pairs of poles,
 a stator having a plurality of teeth around which windings forming coils for electromagnetic excitation of the rotor are wound,
 wherein the stator comprises a first type of tooth covering a first electrical angle and a second type of tooth covering a second electrical angle different from the first electrical angle and wherein a phase of the motor is formed by windings wound onto teeth of the first and second type.

The use of teeth of two different types covering two different electrical angles and applying square wave commands to the different coils results in an electromotive force in the form of saw teeth or with a stepped form (corresponding to the sum of square waves of different length) which closely resembles a sinusoidal form where it is possible to obtain "softer" operation and therefore a lower sound level. Moreover, the torque generated at a slow speed of rotation is greater.

According to another aspect of the present invention, the electric motor comprises three phases.

According to another aspect of the present invention, the three phases cover the same electrical angle and are shifted by 120 electrical degrees relative to each other.

According to another aspect of the present invention a phase is associated with two teeth of the first type and two teeth of the second type, the teeth of the same type associated with a phase being arranged at 180 mechanical degrees from each other, the different teeth associated with a phase being arranged at 90 mechanical degrees from each other.

According to another aspect of the present invention, the ratio between the electrical angle covered by the second type of tooth and the electrical angle covered by the first type of tooth is between 0.6 and 0.9, the set of teeth associated with a phase covering an electrical angle corresponding to 360 degrees divided by the number of pairs of poles of the rotor.

According to another aspect of the present invention, the number of turns of a winding wound around a tooth of the first type and the number of turns of a winding of a second type is the same.

According to another aspect of the present invention, the number of turns of a winding wound around a tooth of the first type is greater than the number of turns of a winding wound around a tooth of the second type.

According to another aspect of the present invention, the number of turns of a winding wound around a tooth of the first type is less than the number of turns of a winding wound around a tooth of the second type.

According to another aspect of the present invention, the windings associated with a phase are connected in series.

According to another aspect of the present invention, the windings associated with a phase and wound onto teeth of the first type are connected in parallel to form a first subset, the windings associated with the said phase and wound onto teeth of the second type are connected in parallel to form a second subset, the first and second subsets being connected in series.

According to another aspect of the present invention, a winding wound onto a tooth of the first type and associated with a phase is connected in series with a winding wound onto a tooth of the second type and associated with the said phase so as to form a subset, the different subsets associated with a phase being connected in parallel.

According to another aspect of the present invention, the rotor comprises four pairs of poles.

The present invention also relates to a motor vehicle comprising an electric motor such as that described above.

Further characteristic features and advantages of the invention will emerge from the following description provided by way of a non-limiting example with reference to the attached drawings in which.

In all the figures, identical elements have the same reference numbers.

The following embodiments are examples. Although the description refers to one or several embodiments, this does not means necessarily that each reference relates to the same embodiment or that the characteristic features apply only to one embodiment. Simple characteristic features of different embodiments may also be combined or interchanged to provide other embodiments.

The present invention concerns a brushless dc electric motor, for example an electric motor used in motor vehicle equipment, such as the geared motors of wiper devices.

The electric motor comprises a rotor provided with at least two pairs of poles. The pairs of poles are for example formed by permanent magnets which are uniformly distributed around the periphery of the rotor.

The electric motor also comprises a stator having a plurality of teeth around which windings forming coils for electromagnetic excitation of the rotor are wound. These coils form the phases of the motor and energization thereof allows rotation of the rotor by means of the permanent magnets.

Figure 1:
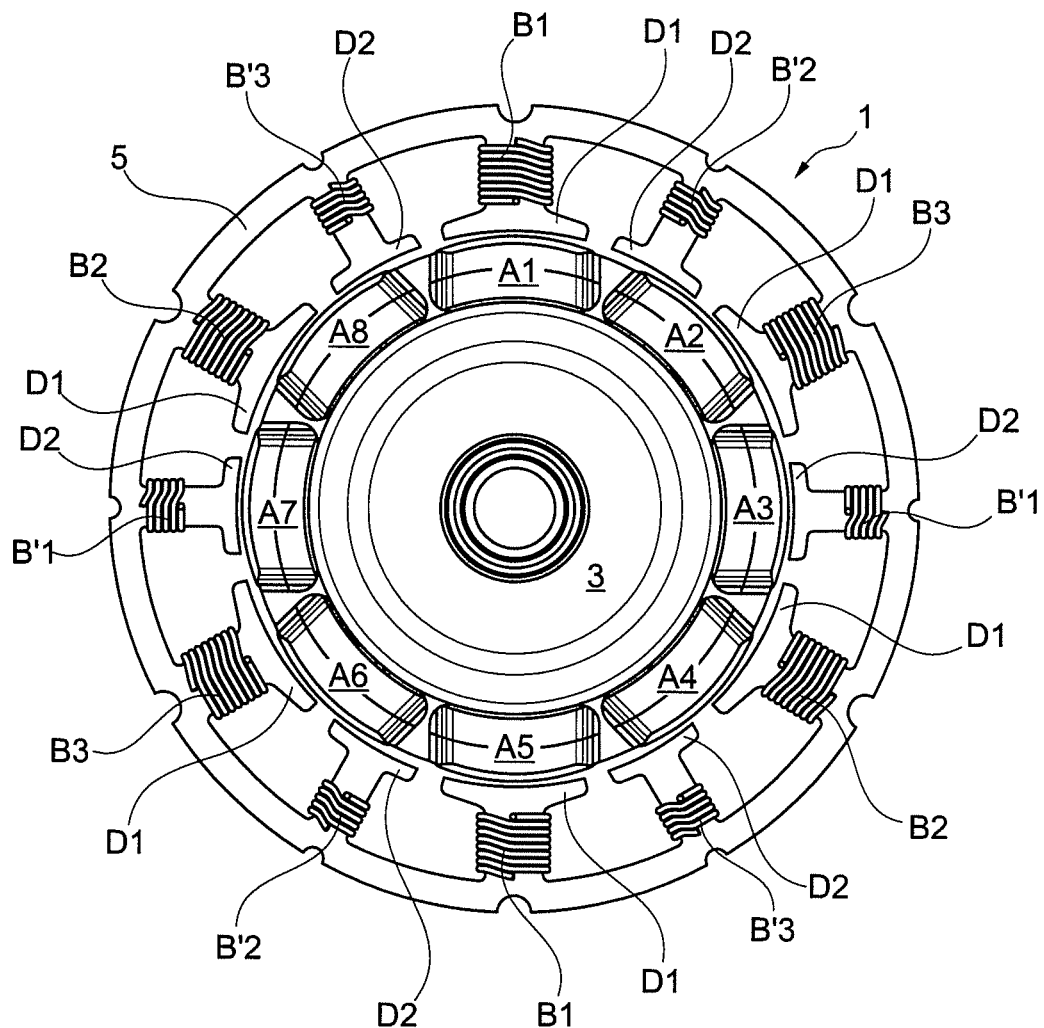
FIG. 1 shows a diagram of a part of a three-phase electric motor according to the present invention.

FIG. 1 shows a portion of such an electric motor 1 comprising a central rotor 3 provided with four pairs of poles formed by eight permanent magnets denoted A1, A2 ... A8.

The electric motor 1 also comprises a stator 5 arranged around the rotor 3 and comprising twelve teeth D1, D2 distributed around the rotor 3.

Figure 2:
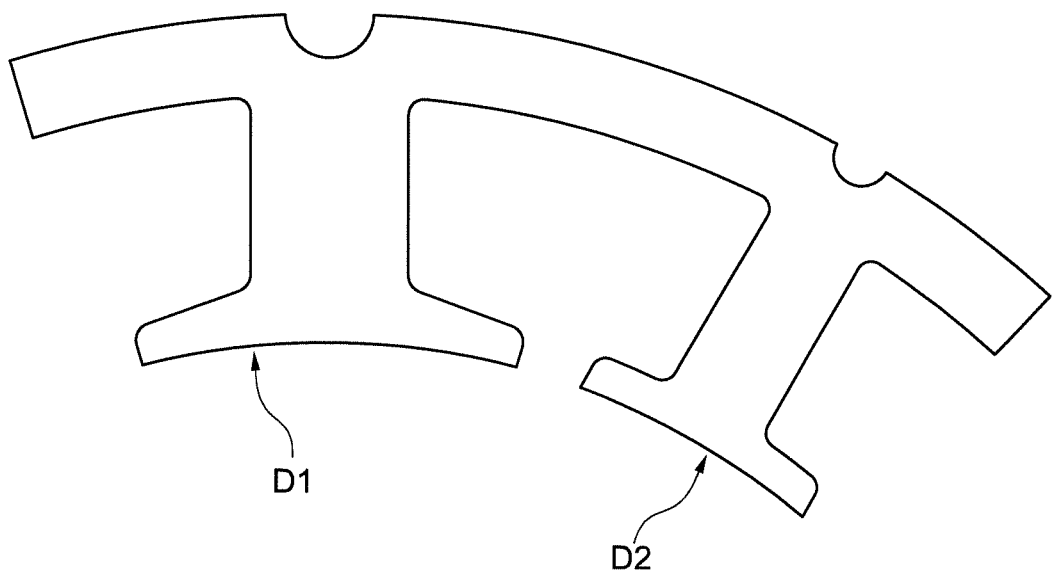
FIG. 2 shows a diagram of two adjacent teeth of a stator according to the present invention.

The stator 5 comprises six teeth denoted D1 of a first type covering a first electrical angle, for example 27°, and six teeth denoted D2 of a second type covering a second electrical angle, for example of 18°, the teeth of the first type D1 and second type D2 being distributed alternately, the spacing between two adjacent teeth D1, D2 being fixed for all the teeth D1, D2. FIG. 2 is a diagram showing an example illustrating the dimensions of a tooth of the first type D1 and a tooth of the second type D2.

The electric motor 1 shown in the FIG. 1 is a three-phase motor such that four teeth D1, D2, i.e. two teeth of the first type D1 and two teeth of the second type D2, are associated with each phase. The windings associated with the first phase are denoted B1 for the teeth of the first type D1, and B'1 for the teeth of the second type D2, the windings associated with the second phase are denoted B2 for the teeth of the first type D1 and B'2 for the teeth of the second type D2, and the windings associated with the third phase are denoted B3 for the teeth of the first type D1 and B'3 for the teeth of the second type D2. The teeth D1, D2 associated with a phase are arranged at 90 (mechanical) degrees from each other, two teeth of the same type D1 or D2 (associated with a phase B1, B2, B3) being arranged at 180 (mechanical) degrees from each other.

The ratio between the first electrical angle associated with the first type of tooth D1 and the second electrical angle associated with the second type of tooth D2 is here equal to 0.66, but a ratio of between 0.5 and 0.9 may be chosen.

Figure 3:
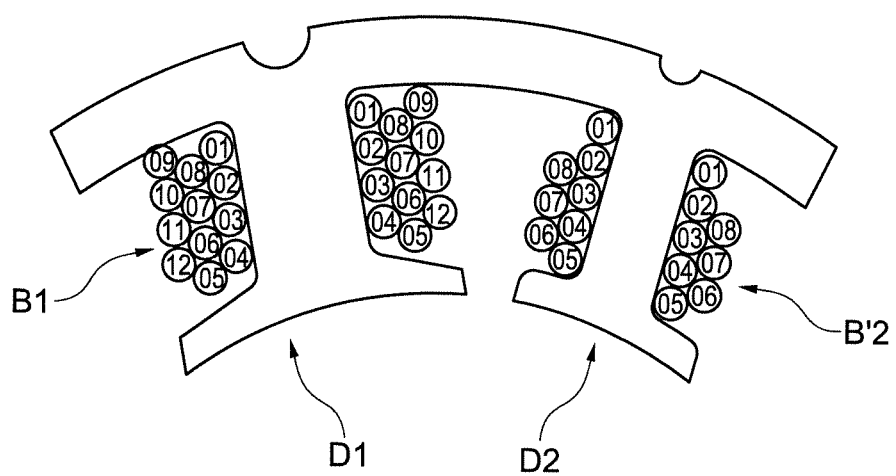
FIG. 3 shows a diagram of the distribution of the windings on a stator of the present invention.

Moreover, in this embodiment, as shown in FIG. 3, the number of turns of the windings B1, B2 or B3, here B1 associated with the first type of tooth D1, is greater than the number of turns of the windings B'1, B'2, B'3, here B'2, associated with the second type of tooth D2 such that the value of the electromagnetic force produced by the windings B1, B2, B3 associated with the first type of teeth D1 is greater than the values of the electromotive force produced by the windings B'1, B'2, B'3 associated with the second type of tooth D2. However, it is also possible to use teeth of the first type D1 and the second type D2 with the same number of turns of the windings (the values of the electromotive forces produced are therefore the same) or teeth of the second type D2 with windings comprising a number of turns greater than the number of turns of the windings associated with the tooth of the first type D1 (the value of the electromotive force produced by the windings associated with the second type of tooth D2 is thus greater than the value of the electromotive force produced by the windings associated with the first type of tooth D1).

Moreover, the windings of the different teeth of a phase may be associated in different configurations (here the possible configurations for the first phase in the case of an electric motor 1 according to FIG. 1 are described).

Figure 4:
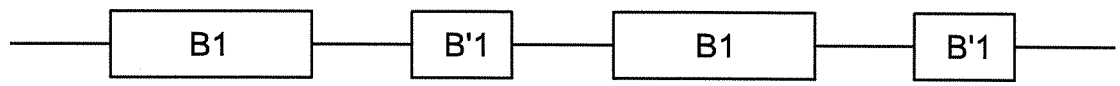
FIG. 4 shows the connection between the windings associated with a phase according to a first configuration.

According to a first configuration corresponding to FIG. 4, the different windings are associated in series, a winding B1 associated with a tooth of the first type D1 being associated in series with a winding B'1 associated with a tooth of the second type D2.

Figure 5:
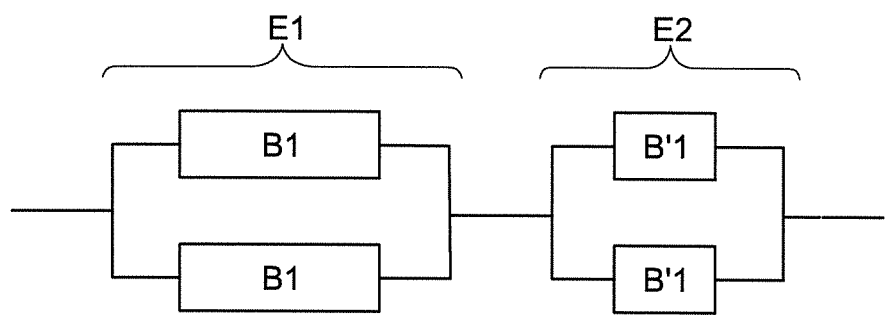
FIG. 5 shows the connection between the windings associated with a phase according to a second configuration.

According to a second configuration corresponding to FIG. 5, the windings B1 and B'1 associated with the teeth of a same type D1 and D2 are associated in parallel so as to form a first and a second subset denoted respectively E1 and E2, the two subsets being connected in series.

Figure 6:
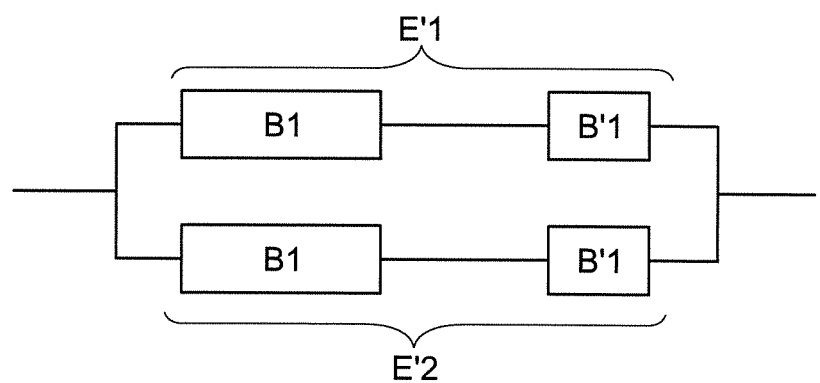
FIG. 6 shows the connection between the windings associated with a phase according to a third configuration.

According to a third configuration corresponding to FIG. 6, a winding B1 associated with a tooth of the first type D1 is connected in series with a winding B'1 associated with a tooth of the second type D2 so as to form a subset E'1 or E'2, the two subsets denoted E'1 and E'2 being connected in parallel.

The configuration chosen is the same for all the phases.

Figure 7:
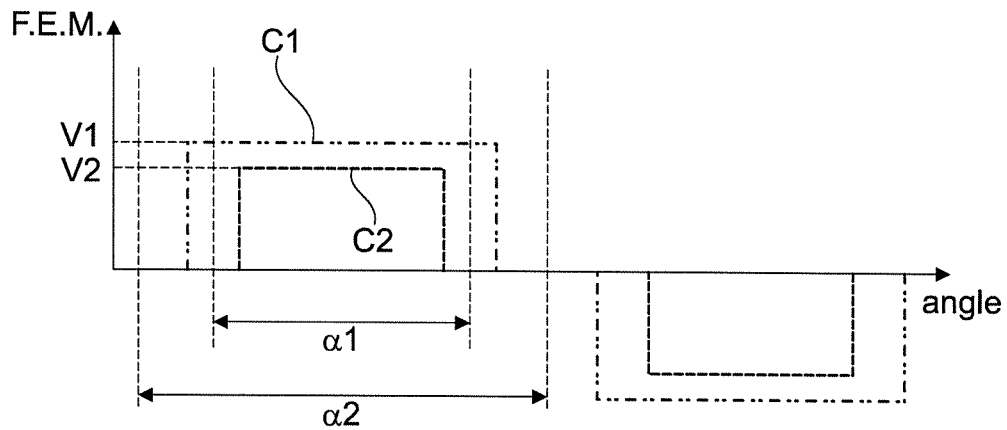
FIG. 7 shows the voltage signals provided by a tooth of the first type and a tooth of the second type associated with a phase.

As shown in FIG. 7, by using teeth of a first type D1 and second type D2 covering a different electrical angle for each phase of the electric motor 1 it is possible to obtain electromotive forces in the form of square waves denoted C1 and C2, respectively, with a different width for the teeth of the first type D1 and the second type D2. The width of the square wave C1 corresponds to an electrical angle greater than an angle $\alpha 1$ of 120° and less than an angle $\alpha 2$ of 180°. The width of the square wave C2 corresponds to an electrical angle less than an angle $\alpha 1$ of 120° (electrical angle of 120° corresponding to the mean electrical angle covered by the teeth of a phase of a three-phase motor). Furthermore, as indicated above, the square wave C1 has an amplitude V1 much greater than the amplitude V2 of the square wave C2 owing to the larger number of turns for teeth of the type D1. The amplitude V1 associated with the teeth of the first type D1 is therefore greater than the amplitude V2 associated with the teeth of type D2.

Figure 8:
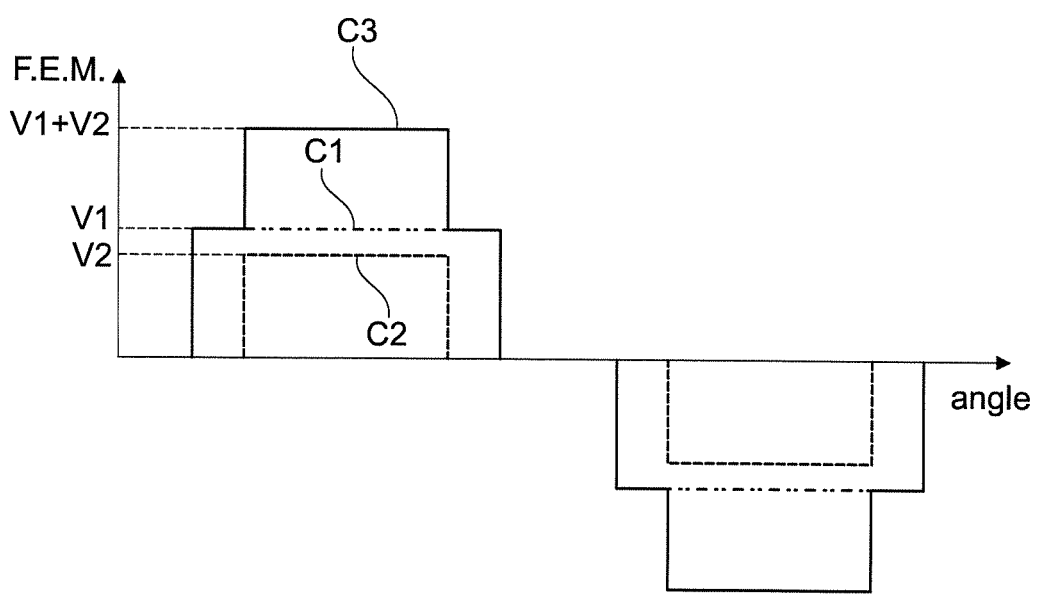
FIG. 8 shows the sum of the voltage signals provided by a tooth of the first type and a tooth of the second type associated with a phase.

FIG. 8 shows a graph C3 corresponding to the sum of the square waves C1 and C2. In fact, in FIG. 1, it can be seen that the teeth of the first type D1 and second type D2 associated with a phase are situated opposite a permanent magnet at the same time such that the electromotive force obtained corresponds to the sum of the electromotive forces obtained from teeth of the first type D1 and second type D2. The graph C3 has a stepped form which closely resembles a sinusoidal form, thus making it possible to obtain smoother operation of the electric motor 1. Owing to this smoother operation it is possible to reduce the noise level and optimize the overall performance of the electric motor 1 providing a greater torque at slower speeds of rotation.

The present invention is not limited to electric motors comprising a stator with teeth of two different sizes (covering two different electrical angles), but also includes a greater number of different tooth sizes, for example three or four different tooth sizes (covering different electrical angles).

The number of pairs of poles of the stator may also be different from four.

The invention claimed is:

1. A brushless dc electric motor comprising:
   a rotor comprising at least two pairs of poles; and
   a stator having a plurality of teeth around which windings forming coils for electromagnetic excitation of the rotor are wound,
   wherein the stator comprises a first type of tooth covering a first electrical angle and a second type of tooth covering a second electrical angle different from the first electrical angle,
   wherein a phase of the motor is formed by windings wound onto teeth of the first type and second type,
   wherein the first and second type of teeth covering the first and second electrical angles results in an electromotive force with a stepped form substantially similar to a sinusoidal form, and
   wherein the windings associated with a phase and wound onto teeth of the first type are connected in parallel to form a first subset, the windings associated with the said phase and wound onto teeth of the second type are connected in parallel to form a second subset, the first subset and the second subset being connected in series.

2. The electric motor according to claim 1, comprising three phases.

3. The electric motor according to claim 2, wherein the three phases cover the same electrical angle and are shifted by 120 electrical degrees with respect to each other.

4. The electric motor according to claim 3, wherein a phase is associated with two teeth of the first type and two teeth of the second type, the teeth of the same type associated with a phase being arranged at 180 mechanical degrees from each other, the different teeth associated with a phase being arranged at 90 mechanical degrees from each other.

5. The electric motor according to claim 4, wherein the ratio between the electrical angle covered by the second type of tooth and the electrical angle covered by the first type of tooth ranges between 0.6 and 0.9, the set of teeth associated with a phase covering an electrical angle corresponding to 360° divided by the number of pairs of poles of the rotor.

6. The electric motor according to claim 1, wherein the number of turns of a winding wound onto a tooth of the first type and the number of turns of a winding of the second type is the same.

7. The electric motor according to claim 1, wherein the number of turns of a winding wound around a tooth of the first type is greater than the number of turns of a winding wound around a tooth of the second type.

8. The electric motor according to claim 1, wherein the number of turns of a winding wound around a tooth of the first type is less than the number of turns of a winding wound around a tooth of the second type.

9. The electric motor according to claim 1, wherein the windings associated with a phase are connected in series.

10. The electric motor according to claim 1, wherein the rotor comprises four pairs of poles.

11. A motor vehicle comprising an electric motor according to claim 1.

12. The electric motor according to claim 1, wherein the substantially sinusoidal waveform results from applying square wave commands to the coils, and wherein the substantially sinusoidal waveform results in a low sound level of the motor.

13. A brushless dc electric motor comprising:

a rotor comprising at least two pairs of poles; and a stator having a plurality of teeth around which windings forming coils for electromagnetic excitation of the rotor are wound, wherein the stator comprises a first type of tooth covering a first electrical angle and a second type of tooth covering a second electrical angle different from the first electrical angle, wherein a phase of the motor is formed by windings wound onto teeth of the first type and second type, wherein the first and second type of teeth covering the first and second electrical angles results in an electromotive force with a stepped form substantially similar to a sinusoidal form, and wherein the winding wound onto a tooth of the first type and associated with a phase is connected in series with a winding wound onto a tooth of the second type and associated with the said phase so as to form a subset, the different subsets associated with a phase being connected in parallel.

* * * * *